United States Patent

[11] 3,588,186

| [72] | Inventor | Robert J. Worbois<br>Irwin, Pa. |
|---|---|---|
| [21] | Appl. No. | 843,515 |
| [22] | Filed | July 22, 1969 |
| [45] | Patented | June 28, 1971 |
| [73] | Assignee | Westinghouse Air Brake Company<br>Wilmerding, Pa. |

[54] LOCOMOTIVE BRAKE CONTROL APPARATUS SUITED FOR REMOTE MULTIPLE UNIT OPERATION
7 Claims, 3 Drawing Figs.

| [52] | U.S. Cl. | 303/20, 105/61, 246/167 |
|---|---|---|
| [51] | Int. Cl. | B60t 13/70 |
| [50] | Field of Search | 105/61; 246/167; 303/20 |

[56] References Cited
UNITED STATES PATENTS

| 3,240,929 | 3/1966 | Hughson | 246/167 |
|---|---|---|---|
| 3,374,035 | 3/1968 | Howard | 303/20 |
| 3,384,033 | 5/1968 | Ruff | 105/61 |
| 3,402,972 | 9/1968 | Cooper et al. | 303/20 |
| 3,432,210 | 3/1969 | Crouch | 303/20 |

OTHER REFERENCES
RAILWAY LOCOMOTIVES AND CARS, October 1967, pp. 25—27

*Primary Examiner*—Milton Buchler
*Assistant Examiner*—S. G. Kunin
*Attorneys*—Adelbert A. Steinmiller and Ralph W. McIntire, Jr.

ABSTRACT: Brake control apparatus for the lead locomotive of a multiple unit locomotive control system wherein the brake valve on the lead locomotive is manually operable conventionally to control application and release of the brakes on the forward portion of the train from the lead locomotive and also to effect corresponding control (via radio-transmitted signals initiated by manual operation of the brake valve on the lead locomotive) of the brakes on the remaining portion of the train from the brake valve on a slave locomotive remotely located in the train. Switch devices selectively operated in correspondence to the operation of the brake valve on the lead locomotive establish suitable control circuitry for radio transmission of appropriate brake control signals from the lead to the slave locomotive. A pressure sensitive transistor responsive to pressure of fluid released from the equalizing reservoir on the lead locomotive effects operation of one of said switch devices to cause the brake valve on the slave locomotive to operate to reduce the pressure in the corresponding equalizing reservoir so long as equalizing reservoir pressure is reduced on the lead locomotive.

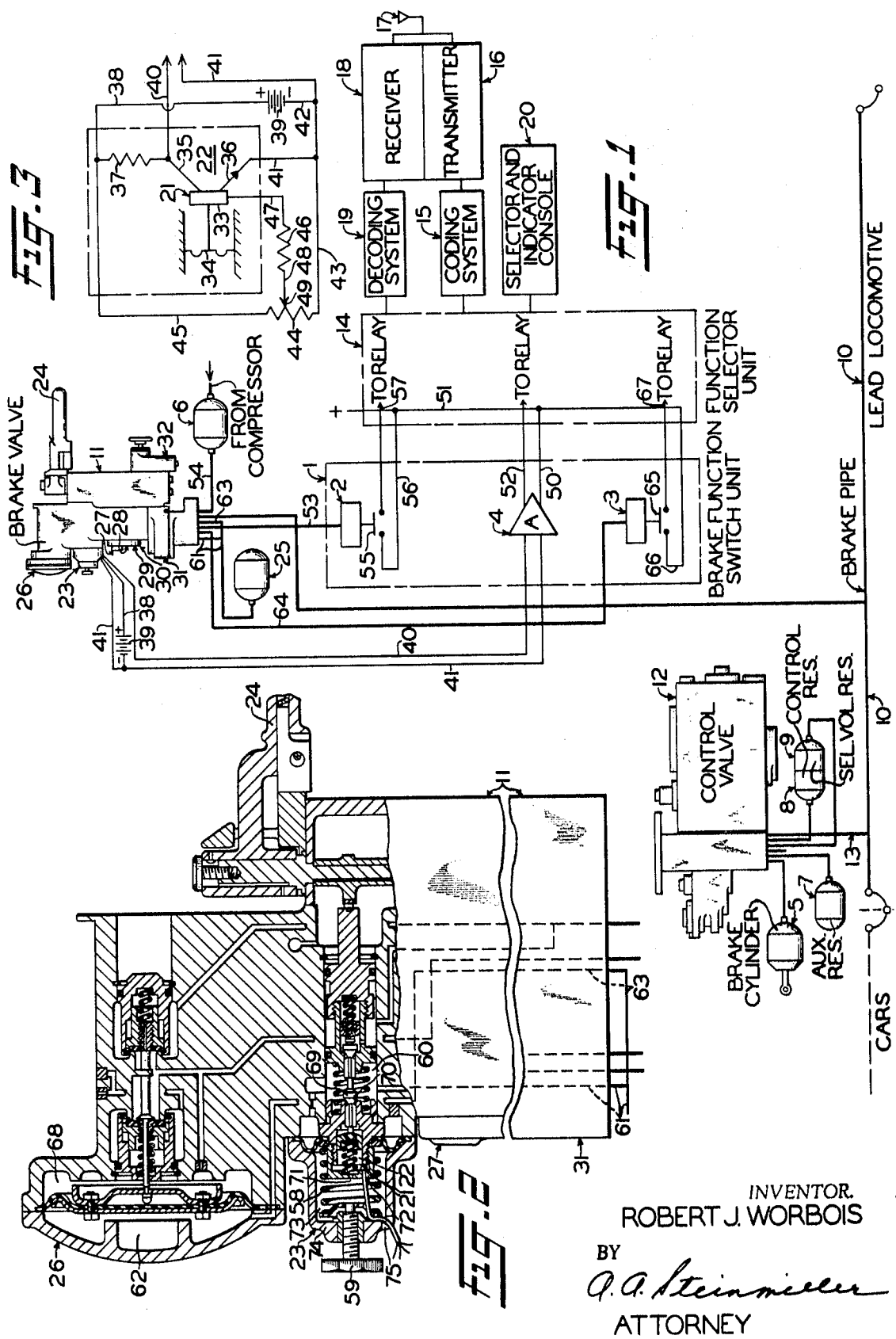

3,588,186

LOCOMOTIVE BRAKE CONTROL APPARATUS SUITED FOR REMOTE MULTIPLE UNIT OPERATION

BACKGROUND OF INVENTION

There are presently in use on some American railroads so-called RMU (remote multiple unit) brake control systems capable of effecting, via radio communicated signals, simultaneous operation of brake controls on one or more slave locomotives located in spaced relation along the length of a train by operation of the brake controls on the lead locomotive. In one such brake control system, the lead locomotive is provided, in addition to the usual engineer's brake valve, with a manually operated pushbutton type brake control console the manual operation of which simultaneously effects electropneumatic control of pressure in an equalizing reservoir and the brake pipe on the lead locomotive and also, via radio communicated signals, control of pressure in an equalizing reservoir and the brake pipe on the slave locomotive, whereby operation of the brake equipment on those cars located between the slave locomotive or locomotives and the end of the train occurs substantially simultaneously with operation of the brake equipment on those cars located intermediate the lead and slave locomotives. The additional control equipment to insure that a locomotive is adaptable for use as the lead locomotive in RMU operation represents not only additional equipment cost but additional difficulties in servicing and maintaining the equipment.

Accordingly, it is the purpose of this invention to provide a locomotive control equipment suitable for use on the lead locomotives in RMU operation without the additional separate control equipment including a manually operated push button type brake control console.

SUMMARY OF INVENTION

According to the present invention, a novel locomotive brake control equipment suited for RMU operation is provided in which the conventional engineer's brake valve is employed for RMU operation, that is control of the brakes on the lead locomotive and on the slave locomotives in the same train, without the addition of a separate pushbutton type brake control console.

This is made possible by the provision of a brake function switch unit that includes a pair of fluid pressure operated switches and an amplifier that functions as a third switch. The switches are operable selectively in accordance with manual movement of the brake valve handle to its various brake control positions, in which the brake valve functions in its normal manner to control the pressure in the equalizing reservoir on the lead locomotive for brake control purposes and at the same time, via radio communicated signals initiated by operation thereof, effect similar variation of the pressure in the equalizing reservoir on the slave locomotives to cause corresponding simultaneous brake control from the slave locomotives. Operation of the amplifier is controlled by a commercially available pressure-sensitive transistor that is so located within the regulating valve of the engineer's brake valve on the lead locomotive as to be subject to the fluid under pressure released from the corresponding equalizing reservoir upon operation of the regulating valve in response to manual movement of the handle of the brake valve out of its release position and to a chosen position in its application zone to effect a brake application on the train to a degree in accordance with the position to which the handle is moved.

In the accompanying drawing:

FIG. 1 is a diagrammatic view of the brake control equipment embodying the invention employed on a locomotive when it is used as the lead locomotive in RMU operation.

FIG. 2 is an enlarged view, partly in section, of the engineer's brake valve shown in FIG. 1 showing the pressure-sensitive transistor located within the exhaust valve discharge chamber of the regulating valve.

FIG. 3 is a diagram of control circuitry including the pressure-sensitive transistor shown in FIG. 2.

As shown in FIG. 1 of the drawings, the conventional control equipment heretofore provided on a locomotive when it is used as the lead locomotive in remote multiple unit operation is modified by the inclusion of a brake function switch unit 1 embodying two fluid pressure operated switches 2 and 3 and an amplifier 4 and the elimination of the heretofore known and used manually operable brake control console which embodied a plurality of pushbutton type of switches that were manually operated to effect brake applications and brake releases on the plurality of locomotives and cars comprising the train, it being understood that operation of the brake equipment on the slave locomotive or locomotives and those cars comprising the portion of the train coupled to the most remote slave locomotive is effected via radio-transmitted signals.

The brake control equipment constituting the present invention further comprises for pneumatically controlling the brakes on the lead locomotive a brake cylinder 5, a main reservoir 6, an auxiliary reservoir 7, a control reservoir 8 which is combined with a selector volume reservoir 9 into a two-compartment reservoir, a brake pipe 10 that extends from end to end of the locomotive and at one end is coupled to the train brake pipe by the usual hose and hose couplings, an engineer's automatic brake valve 11 operative to control the pressure in the brake pipe 10, and a fluid pressure brake control valve 12 that is connected by a branch pipe 13 to the brake pipe 10.

In order to effect operation of the brake equipment on one or more slave locomotives via radio signals transmitted thereto from the lead locomotive, the brake control equipment embodying the present invention further includes a function selector unit 14 having a plurality of electrical relays, the pickup circuits of three of which are controlled respectively by the two hereinbefore-mentioned fluid pressure operated switches 2 and 3 and the amplifier 4, a coding system 15 for receiving the output information of the function selector unit 14 and preparing this information for transmittal to a slave locomotive via a radio transmitter 16 having an antenna 17. This brake equipment on the lead locomotive further comprises a radio receiver 18 for receiving via antenna 17 information in the form of radio signals transmitted from the slave locomotive regarding the status of this locomotive and converting these radio signals to electrical inputs which are fed to a decoding system 19 that in turn transmits the information regarding the slave locomotive to the function selector unit 14 which coordinates this information and furnishes it to a selector and indicator console 20 for display.

In order to control operation of the amplifier 4 which operates as a third switch in the brake function switch unit 1, the novel brake control equipment on the lead locomotive includes a commercially available pressure-sensitive transistor 21 (FIG. 3) which, as shown in FIG. 2, is disposed within the exhaust valve chamber 22 of a self-lapping regulating or control valve 23 of the engineer's brake valve device 11. This pressure sensitive transistor 21 is subject to fluid under pressure so long as the self-lapping control valve 23 is effective in response to movement of a handle 24 of this brake valve 11 from its release position to a chosen position in its application zone, to release fluid under pressure from an equalizing reservoir 25 to atmosphere, and when so subject to fluid under pressure provides an output voltage to the amplifier 4 to control the operation thereof in a manner hereinafter explained in detail.

The engineer's brake valve 11 may be, such as, for example, the No. 26 type of self-lapping brake valve manufactured by the Westinghouse Air Brake Division of Westinghouse Air Brake Company, a subsidiary of American Standard, Inc.

In addition to the control valve 23, the brake valve 11 comprises a relay valve 26, a brake pipe cutoff valve 27, a vent valve 28, an emergency valve 29, a suppression valve 30, an equalizing reservoir cutoff valve 31, and a manually positionable selector valve 32 for selectively conditioning the brake valve 11 for effecting either direct release operation of the brake control valve on each car in a train of cars hauled by a locomotive provided with the engineer's brake valve 11, if each car is provided with a direct release type brake control valve, or graduated application and graduated release operation of the brake control valve on each car if each car is provided with a graduated release type brake control valve, for cutting out control of brake pipe pressure by the brake valve 11 for remote multiple unit or trailing (pusher) unit operation, or for conducting a brake pipe leakage test. The vent valve 28 forms no part of the present invention and will not be described in detail herein.

The brake control valve 12 may be of any suitable type, such as, for example, a 26-F type of brake control valve manufactured by the Westinghouse Air Brake Division of Westinghouse Air Brake Company, a subsidiary of American Standard, Inc.

The function selector unit 14 may be such as, for example, an A-3-A type of selector unit manufactured by the Westinghouse Air Brake Division of Westinghouse Air Brake Company, a subsidiary of American Standard, Inc.

The coding system 15, the transmitter 16, the receiver 18 and the decoding system 19 are all embodied in a single coding cabinet and constitute the 580 solid state code system manufactured by the Signal & Communications Division of Westinghouse Air Brake Company, a subsidiary of American Standard, Inc.

The antenna 17 may be such as, for example, a 6 AN-1 antenna manufactured by Antenna Specialists Company. This antenna 17 is connected to the transmitter 17 and receiver 18 by a suitable cable.

The selector and indicator console 20 may be such as, for example, an A-2 type of selector and indicator console manufactured by the Westinghouse Air Brake Division of Westinghouse Air Brake Company, a subsidiary of American Standard, Inc.

The pressure-sensitive transistor 21 (FIG. 3) is a piezotransistor which is a silicon NPN planar transistor that has its emitter-base junction 33 mechanically coupled to a diaphragm 34. When the control valve 23 is operated, in response to actuate manual movement of the handle 24 of the brake valve 11 out of its release position and to a chosen position in its application zone, to release fluid under pressure from the equalizing reservoir 25, the pressure of the fluid thus released acts on the left-hand side of the diaphragm 34 to produce a large reversible change in the transistor's characteristics, such as, for example, its output voltage.

The pressure-sensitive transistor 21 further comprises a collector 35 and an emitter 36. The collector 35 is connected to one end of a resistor 37 the opposite end of which is connected by a wire 38 to the positive terminal of a source of electrical current such as, for example, a battery 39. The output voltage of the transistor 21 is delivered to one side of the amplifier 4 via a wire 40 this one side of the amplifier 4 being connected to the emitter 36 via a wire 41. One end of a wire 42 is connected to the wire 41 intermediate the ends thereof and the opposite end is connected to the negative terminal of the battery 39.

One end of a wire 41 is connected to the wire 42 intermediate the ends thereof and the opposite end is connected to one end of a center tap potentiometer 44. The other end of this potentiometer 44 is connected to one end of a wire 45 that has its opposite end connected to the wire 38 intermediate the ends thereof. One end of a second resistor 46 is connected by a wire 47 to the emitter-base junction 32 the opposite end of which is connected by wire 48 to a potentiometer arm 49 the manual movement of which varies the voltage in the base-emitter circuit of the transistor 21 until the proper voltage is obtained to insure that the amplifier 4 causes pickup of the application relay when the pressure acting on the diaphragm 34 reaches the desired value such as, for example 3 pounds per square inch.

The other side of the amplifier 4 has connected thereto one end of a first wire 50 that has its opposite end connected to a wire 51 (FIG. 1) in the function selector unit 14 that leads from the positive terminal of a suitable source of electrical power (not shown). This other side of the amplifier 4 also has connected thereto one end of a second wire 52 that is connected to a brake application relay (not shown) in the function selector unit 14 to cause energization or pickup of this relay. Whenever this relay is thus picked up, transmission of the brake application command signal to the slave locomotive or locomotives is made via radio-transmitted signals effected by operation of the coding system 15, transmitter 16 and antenna 17.

As shown in the drawing, one end of a pipe 53 is connected to the hereinbefore-mentioned fluid pressure operated switch 2 and the opposite end of this pipe is connected to a corresponding passageway (not shown) in the engineer's brake valve 11 which passageway leads to the emergency valve 29. It will be understood that while the handle 24 of the brake valve 11 occupies its release position and all other positions except emergency position, the emergency valve 29 occupies a corresponding position in which it establishes a communication between the pipe and corresponding passageway 53 and atmosphere so that fluid under pressure is completely vented from the fluid pressure operated switch 2. It will be further understood, that upon manual movement of the handle 24 to its emergency position, the emergency valve 29 is moved to a corresponding emergency position in which it establishes a communication through which fluid under pressure may flow from the main reservoir 6 to the switch 2 via a pipe and corresponding passageway 54, a peripheral annular groove (not shown) on the emergency valve 29, and the passageway and corresponding pipe 53 to effect the operation of the switch 2 to its closed position. In the closed position of normally open contact 55 of switch 2 a circuit is established between a wire 56 that is connected to the hereinbefore-mentioned power supply wire 51 and a wire 57 that is connected to an emergency relay (not shown) in the function selector unit 14 to cause energization or pickup of this relay. Whenever this relay is thus picked up, transmission of the emergency brake application command signal to the slave locomotive or locomotives is made via radio transmitted signals effected by the coding system 15, transmitter 16, and antenna 17.

The main reservoir 6 is charged with fluid under pressure by the usual fluid compressor (not shown) carried on the locomotive.

OPERATION

Let it be supposed that a locomotive is provided with the brake control apparatus shown in the drawing and that this locomotive is the lead locomotive in an RMU train system. Let it be further supposed that one or more other locomotives is coupled between two cars in the train which may be a distance from the lead locomotive, and that the brake control equipment on this slave locomotive or locomotives includes, with the exception of the brake function switch unit 1, the same brake control equipment as shown in the drawing with the addition of a brake control center which may be, such as, for example, an A-410 brake control center manufactured by the aforesaid Westinghouse Air Brake Division. It will be understood that this brake control equipment on the slave locomotive or locomotives is operated in response to the radio transmitted signals from the lead locomotive to control the pressure in the equalizing reservoir on this slave locomotive or locomotives and correspondingly the pressure in that portion of the train brake pipe extending in both directions from this slave locomotive or locomotives.

After a train is made up, the lead and slave locomotive control equipments must be conditioned as follows:

1. The controls on the lead locomotive set for lead operation.
2. The selector valve 32 of the brake valve 11 on both the lead and the slave locomotives set in freight position.

3. The power supply switch of the selector and indicator console 20 shown in the drawing is set in power ON position it being understood that a fluid pressure brake switch on this console 20 is set in an IN position, subsequent to the setting of this power supply switch in its power ON position.

4. The controls on the slave locomotive or locomotives is set for trailing operations, except for the fluid pressure brakes, which must be set for lead operation. 5. The handle 24 of the brake valve 11 on the slave locomotive or locomotives must be moved to its brake release position.

6. The function selector unit on the slave locomotive or locomotives set in power ON position.

In order to initially effect charging of the brake pipe 10 on the lead locomotive and the train brake pipe that extends through each car in the train and the brake equipment on each of these cars, the engineer on the lead locomotive will manually move the handle 24 of the brake valve 11 on this locomotive to its brake release position.

Also, it may be assumed that a regulating spring 58 of the self-lapping control valve 23 of the brake valve 11 on both the lead and the slave locomotive or locomotives has been manually adjusted by means of an adjusting screw 59 so that this control valve 23 will provide in its delivery chamber 60 (FIG. 2) and in the equalizing reservoir 25 (FIG. 1) connected thereto by a pipe and corresponding pipe 61 a desired normal pressure, which, for example, may be 70 pounds per square inch.

It will be understood that while the selector valve 32 of the brake valve 11 on each locomotive occupies its freight position, the supply of fluid under pressure from the main reservoir 6 on the respective locomotives to the corresponding equalizing reservoir cutoff valve 31 will be effected only while the handle 24 occupies its brake release position to cause opening of this valve. Consequently, fluid under pressure will flow from the delivery chamber 60 (FIG. 2) of the control valve 23 of the brake valve 11 on the lead locomotive to the corresponding equalizing reservoir 25 and also to a chamber 62 (FIG. 2) in the relay valve 26 via the pipe 61 and a pipe 63 one end of which is connected to the pipe 61 intermediate the ends thereof and the opposite end of which opens into a corresponding passageway in brake valve 11 which passageway opens into the above-mentioned chamber 62 in the relay valve 26. The relay valve 26 on the lead locomotive operates in response to the supply of fluid under pressure to the above-mentioned chamber 62 therein to effect the supply of fluid under pressure from the main reservoir 6 on the lead locomotive to that portion of the train brake pipe connected to this locomotive.

Upon manual movement of the handle 24 of the brake valve 11 on the lead locomotive to its brake release position, the suppression valve 30 of this brake valve will be moved to a position to effect the supply of fluid under pressure from the main reservoir 6 to the switch 3 via pipe and corresponding pipe 54, the suppression valve 30, and a passageway and corresponding pipe 64.

Fluid under pressure thus supplied to the fluid pressure operated switch 3 operates its normally opened contact 65 to closed position in which it establishes a circuit between a wire 66 that is connected to the positive power supply wire 51 and a wire 67 that is connected to a brake release relay (not shown) in the function selector unit 14 to cause energization or pickup of this relay. Whenever this relay is thus picked up, transmission of the brake release command signal to the slave locomotive is made via radio-transmitted signals effected by the coding system 15, transmitter 16 and antenna 17. When this brake release command signal is received on the slave locomotive it effects energization of a solenoid coil of a brake valve charging cutout spool valve which is thereupon moved to a position to release fluid under pressure from a pressure chamber of the brake pipe cutoff valve 27 of the brake valve 11 on the slave locomotive. Upon this release of fluid under pressure from the pressure chamber of the brake pipe cutoff valve 27 on the slave locomotive, the brake valve 11 on this locomotive is rendered effective to supply fluid under pressure to the train brake pipe. Consequently, the supply of fluid under pressure to the train brake pipe is now simultaneously effected by operation of the relay valve 26 of brake valve 11 on both the lead and the slave locomotive or locomotives until the train brake pipe is charged to the normal pressure carried therein which may be, for example, 70 pounds per square inch and corresponds to the pressure for which the control valve 23 of the plurality of brake valves 11 has been adjusted, as hereinbefore described.

Since the brake control valve 12 is connected to the brake pipe 10 by the branch pipe 13, fluid under pressure will flow from the brake pipe 10 to the brake control valve 12 to effect operation thereof to its release position in which fluid under pressure will be completely released from the brake cylinder 5 thereby releasing the brakes on the lead locomotive, and the auxiliary reservoir 7, control reservoir 8 and selective volume reservoir 9 will be charged to the pressure carried in the brake pipe 10. Likewise, the brake control valve on all the locomotives and cars in the train will operate in response to charging of the train brake pipe to the normal pressure carried therein, which may be, for example, as hereinbefore stated, 70 pounds per square inch, to effect a complete release of brakes on the entire train.

The engineer on the lead locomotive may now start the train on its journey to the next station.

Let it be supposed that after the train has traveled some distance from its starting point, it must descend a grade that requires the engineer on the lead locomotive to effect a brake application. Accordingly, the engineer will move the handle 24 of the brake valve 11 on the lead locomotive out of its release position and to a position in its application zone corresponding to the degree of reduction of pressure desired in the train brake pipe. Therefore, the self-lapping control valve 23 will now operate in the usual manner to effect a reduction in the pressure in the equalizing reservoir 25, and the chamber 62 (FIG. 2) in the relay valve 26 which chamber 62 is connected to the pipe 61 by the passageway and corresponding pipe 63, that corresponds to the position in the application zone to which the handle 24 was moved. This reduction of pressure in the chamber 62 of the relay valve 26 (FIG. 2) causes this relay valve 26 on the lead locomotive to operate to effect a corresponding reduction of pressure in a chamber 68 (FIG. 2) in this relay valve 26, which chamber 68 is connected to the brake pipe 10, and in that portion of the train brake pipe extending from the lead locomotive toward the slave locomotive.

The brake control valve 12 on the lead locomotive operates in response to this reduction of pressure in brake pipe 10 to effect the supply of fluid under pressure from the auxiliary reservoir 7 to the brake cylinder 5 to cause an application of brakes on the lead locomotive.

As the engineer moves the handle 24 of the brake valve 11 on the lead locomotive to the position in its application zone corresponding to the degree of reduction of pressure desired in the train brake pipe, an exhaust valve 69 (FIG. 2), which is disposed in the chamber 60 in the control valve 23, is unseated from its valve seat 70. When valve 69 is thus unseated, fluid under pressure flows from the equalizing reservoir 25 to atmosphere via pipe and passageway 61, chamber 60, past unseated valve 69, exhaust valve chamber 22, a port 71 in an exhaust valve seat member 72, a chamber 73 in a control valve cover 74 and a port 75 in this cover member.

Since the pressure-sensitive transistor 21 is disposed within the exhaust valve chamber 22, as hereinbefore stated, the fluid under pressure released from the equalizing reservoir 25 to atmosphere in the manner just explained is effective on the left-hand side of the diaphragm 34 (FIG. 3). As aforestated, the emitter-base junction 33 of pressure-sensitive transistor 21 is mechanically coupled to the diaphragm 34. Accordingly, it will be understood that the fluid under pressure acting on the left-hand side of the diaphragm 34 transmits a force to the emitter-base junction 33 of transistor 21 to cause an increase in its output voltage. This increase in output voltage is impressed on the input side of amplifier 4 via a circuit that includes emitter-base junction 33, collector 35, wires 40 and 41 and emitter 36 to increase the input voltage to this one side of amplifier 4. When this input voltage to the amplifier 4 reaches a first chosen value, the output side of amplifier 4 is rendered effective to establish a circuit to the brake application relay in the function selector unit 14 via wires 51 and 50, and wire 52. When the circuit to the brake application relay is thus established, this relay is operated to its picked-up position to cause transmission of a brake application command signal to the slave locomotive or locomotives via radio-transmitted signals effected by operation of the coding system 15, transmitter 16 and antenna 17. It will be understood that the brake control equipment on the slave locomotive or locomotives is operative in response to receiving these signals to effect a reduction of pressure in the equalizing reservoir on this or these locomotives and a corresponding reduction of pressure in those portions of the train brake pipe connected thereto so long as these radio-transmitted signals are received from the lead locomotive.

The regulating valve 23 of brake valve 11 on the lead locomotive operates to release fluid under pressure from the equalizing reservoir 25 on this locomotive to atmosphere via the pathway hereinbefore described until the pressure in this equalizing reservoir is reduced to a value corresponding to the position in its application zone to which the handle 24 of the brake valve 11 on the lead locomotive was moved by the engineer. Consequently, upon the pressure in the equalizing reservoir 25 on the lead locomotive being reduced to the desired pressure, the control valve 23 is moved to its lap position in which valve 69 is seated on seat 70 to cut off further flow from the equalizing reservoir 25 to atmosphere. Therefore, subsequent to seating of valve 69 on its seat 70, the fluid pressure force acting on the left-hand side of the diaphragm 34 (FIG. 3) decreases as the fluid under pressure in the chamber 22 flows to atmosphere via port 71, chamber 73 and port 75. As the fluid pressure force acting on the left-hand side of the diaphragm 34 is thus decreased, the force transmitted to the emitter-base junction 33 of transistor 21 is correspondingly decreased which causes a corresponding decrease in the output voltage of transistor 21 which output voltage is impressed on the one side of the amplifier 4 to provide a corresponding input voltage to this one side of amplifier 4. Accordingly, the input voltage to this one side of amplifier 4 is decreased as the output voltage of the transistor 21 is decreased.

When the input voltage to the amplifier 4 is decreased to a second chosen value, which is less than the above-mentioned first chosen value, the amplifier 4 is rendered effective to open the circuit to the brake application relay in the function selector unit 14 whereupon this brake application relay is deenergized and its contacts move to a dropped out position to cause the cessation of the transmission of brake application command signals to the slave locomotive or locomotives by operation of the coding system 15 and transmitter 16.

It will be understood that a solenoid-operated spool valve in the brake control center of the brake control equipment on the slave locomotive or locomotives is operative in response to the cessation of the radio transmission of brake application command signals thereto to terminate venting of fluid under pressure from the corresponding equalizing reservoir. As the venting of fluid under pressure from each equalizing reservoir is thus terminated, the corresponding relay valve is operated to terminate the venting of fluid under pressure from that portion of the train brake pipe connected to the respective locomotive. Accordingly, it will be understood that operation of the brake control valves on all locomotives and cars in the train occurs substantially simultaneously to effect a brake application on the entire train.

The brakes on the entire train can be subsequently released by the engineer on the lead locomotive manually moving the handle 24 of the brake valve 11 on this locomotive out of the position it occupies in its application zone and back to its brake release position. Upon return of the handle 24 to its brake release position, the corresponding control valve 23 operates to effect the supply of fluid under pressure to the equalizing reservoir 25 and relay valve 26 on the lead locomotive whereupon this relay valve operates to effect the supply of fluid under pressure from the main reservoir 6 on this locomotive to that portion of the train brake pipe connected thereto. As aforestated, upon movement of the handle 24 to its brake release position, fluid under pressure is supplied to the switch 3 to cause closing of contact 64 and the pickup of the corresponding brake release relay whereupon transmission of the brake release command signal to the slave locomotive or locomotives is made via radio-transmitted signals. Consequently, the relay valve 26 of the brake valve 11 on the slave locomotive or locomotives operates, in the manner hereinbefore described, to effect the supply of fluid under pressure to that portion of the train brake pipe connected to the slave locomotive or locomotives. Accordingly, fluid under pressure is now supplied to the train brake pipe simultaneously by operation of the relay valve 26 of the brake valve 11 on both the lead and the slave locomotive or locomotives until the train brake pipe is charged to the normal pressure carried therein. As the train brake pipe is thus charged, the brake control valves on the locomotive or locomotives and cars in the train operate in response thereto to effect a release of the brakes on the entire train.

Let it now be supposed that while the brakes on the entire train are released and the train is traveling along the track toward its destination it becomes necessary that the engineer on the lead locomotive effect an emergency brake application.

To effect an emergency brake application on the entire train, the engineer on the lead locomotive will quickly move the handle 24 of the brake valve 11 on this locomotive from its release position to its emergency position to effect a reduction of pressure in the brake pipe 10 and in that portion of the train brake pipe extending from the lead locomotive toward the remote locomotive or locomotives at a rapid or emergency rate. The control valve 12 on the lead locomotive operates in response to this reduction of pressure in the brake pipe 10 at an emergency rate to effect a corresponding emergency brake application on this locomotive.

When the handle 24 is manually moved by the engineer to its emergency position, the emergency valve 29 is moved to a position to establish a communication via which fluid under pressure is supplied from the main reservoir 6 to the pipe 53 which is connected to the switch 2 whereupon the contact 55 of this switch is moved to its closed position. In the closed position of contact 55 it establishes a circuit between the wires 56 and 57 to cause pickup of the hereinbefore mentioned emergency relay in the function selector unit 14 on the lead locomotive.

As hereinbefore stated, when this emergency relay is thus picked up, transmission of the emergency application command signal to the slave locomotive or locomotives is made via radio-transmitted signals effected by the coding system 15, transmitter 16 and antenna 17 on the lead locomotive. It will be understood that the brake control equipment on the slave locomotive or locomotives is operative in response to the emergency application command signal transmitted thereto from the lead locomotive via radio to effect a reduction of pressure in the equalizing reservoir 25 and brake pipe 10 on the slave locomotive or locomotives and in the portions of the train brake pipe extending from each end of this slave locomotive or locomotives at an emergency rate. Accordingly, it will be understood that the brake control valves on all the locomotives and cars in the train operate substantially simultaneously in response to a reduction of pressure in the train brake pipe at an emergency rate to effect an emergency brake application on the entire train.

When the train has been brought to a stop and all danger has passed, the emergency brake application can be released by the engineer moving the handle 24 of the brake valve 11 on the lead locomotive from its emergency position back to its release position.

Having now described the invention, what I claim as new and desire to secure by Letters Patent, is:

I claim:

1. In a multiple locomotive brake control system for a train of cars having a lead locomotive and at least one slave locomotive remotely located therefrom, brake control apparatus for the lead locomotive comprising the combination of:
   a. a normally charged brake pipe, variations of the fluid pressure in which are effective to control brake applications and brake releases on the locomotives and cars in the train;
   b. a normally charged equalizing reservoir;
   c. a brake valve having:
      i. a relay valve which is subject to the opposing pressures in said equalizing reservoir and said brake pipe and is operative by the differential of such pressures to control the pressure in said brake pipe;
      ii. regulating valve means operative to supply fluid under pressure to and release fluid under pressure from said equalizing reservoir thereby to control the pressure therein;
   d. coding and radio signal transmitting means for transmitting command signals from the lead locomotive to a slave locomotive;
   wherein the improvement comprises:
   e. a plurality of fluid pressure responsive devices selectively operated to effect energization of different electrical circuits to cause said coding and radio signal transmitting means to transmit a corresponding signal to a slave locomotive, accordingly as said brake valve is selectively manually operated to corresponding ones of a plurality of operating positions, one of said fluid pressure responsive devices comprising:
      i. a pressure-sensitive transistor subject to fluid under pressure released from said equalizing reservoir by operation of said regulating valve means;
      ii. an amplifier having an input side connected in an electrical circuit including said pressure-sensitive transistor and an output side included in a certain one of said electrical circuits of said coding and radio signal transmitting means; and
      iii. said transistor being effective so long as subject to fluid under pressure in excess of a certain value to impress sufficient output voltage on the input side of said amplifier to cause said output side of said amplifier to effect energization of said certain one of said electrical circuits.

2. In a multiple locomotive brake control system for a train of cars, the combination as claimed in claim 1, further characterized in that said certain one circuit energized by said amplifier causes said coding and radio signal transmitting means to transmit a corresponding service brake application command signal to a slave locomotive.

3. In a multiple locomotive brake control system for a train of cars, the combination as claimed in claim 1, further characterized in that a second one of said plurality of fluid pressure responsive devices comprises a switch that is operated to a circuit closing position, upon operation of said brake valve to its brake release position, to establish a second one of said electrical circuits to cause said coding and radio signal transmitting means to transmit a brake release command signal to a slave locomotive.

4. In a multiple locomotive brake control system for a train of cars, the combination as claimed in claim 1, further characterized in that a third one of said plurality of fluid pressure responsive devices comprises a switch that is operated to a circuit closing position, upon operation of said brake valve to its emergency position, to establish a third one of said electrical circuits to cause said radio signal transmitting means to transmit an emergency brake application command signal to a slave locomotive.

5. In a multiple locomotive brake control system for a train of cars, the combination as claimed in claim 1, further characterized in that said transistor comprises a collector connected to said input side of said amplifier.

6. In a multiple locomotive brake control system for a train of cars, the combination as claimed in claim 1, further characterized in that said transistor causes said amplifier to effect energization of said certain one of said electrical circuits when the output voltage of the transistor exceeds a first chosen value and causes said amplifier to effect deenergization of said certain one of said electrical circuits when the output voltage of the transistor reduces below a second chosen value less than said first chosen value.

7. In a multiple locomotive brake control system for a train of cars, the combination as claimed in claim 1, further characterized in that said regulating valve means includes an exhaust chamber and an exhaust valve for controlling flow of fluid under pressure from said equalizing reservoir to said exhaust chamber, and in that said pressure-sensitive transistor is disposed in and subject to fluid pressure established in said exhaust chamber.